(12) United States Patent
Cho et al.

(10) Patent No.: US 10,736,126 B2
(45) Date of Patent: Aug. 4, 2020

(54) METHOD FOR ADAPTIVELY ADJUSTING SECURITY LEVEL OF V2X COMMUNICATION MESSAGE AND APPARATUS THEREFOR

(71) Applicants: HYUNDAI MOTOR COMPANY, Seoul (KR); KIA MOTORS CORPORATION, Seoul (KR)

(72) Inventors: A Ram Cho, Suwon-si (KR); Seung Wook Park, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/873,413

(22) Filed: Jan. 17, 2018

(65) Prior Publication Data
US 2018/0255562 A1 Sep. 6, 2018

(30) Foreign Application Priority Data
Mar. 3, 2017 (KR) .................. 10-2017-0027814

(51) Int. Cl.
| | |
|---|---|
| *H04W 72/12* | (2009.01) |
| *H04L 29/06* | (2006.01) |
| *H04W 12/06* | (2009.01) |
| *H04W 4/42* | (2018.01) |
| *H04W 4/46* | (2018.01) |
| *H04W 4/48* | (2018.01) |
| *H04W 4/70* | (2018.01) |

(Continued)

(52) U.S. Cl.
CPC ......... *H04W 72/1242* (2013.01); *H04L 63/20* (2013.01); *H04W 4/42* (2018.02); *H04W 4/46* (2018.02); *H04W 4/48* (2018.02); *H04W 4/70* (2018.02); *H04W 4/90* (2018.02); *H04W 12/06* (2013.01); *H04W 72/10* (2013.01); *H04W 72/1247* (2013.01); *H04W 76/50* (2018.02)

(58) Field of Classification Search
CPC ................................. H04W 72/1242
See application file for complete search history.

(56) References Cited

U.S. PATENT DOCUMENTS

| | | | | |
|---|---|---|---|---|
| 7,283,904 B2* | 10/2007 | Benjamin | ............. | H04W 12/06 701/117 |
| 7,899,621 B2* | 3/2011 | Breed | .................... | G08G 1/161 701/301 |

(Continued)

*Primary Examiner* — Andrew Lai
*Assistant Examiner* — Andrew C Lee
(74) *Attorney, Agent, or Firm* — Morgan, Lewis & Bockius LLP

(57) ABSTRACT

A method of processing a vehicle-to-everything (V2X) message in a V2X message transmitting entity may comprise obtaining, at the V2X message transmitting entity, status information of a transmission target entity; determining adaptively a security level for a V2X message to be transmitted to the transmission target entity based on the obtained status information; and generating the V2X message according to the determined security level, and transmitting the V2X message to the transmission target entity. Because security levels of V2X messages are adaptively determined, the V2X messages can be processed according to a processing capability of the transmission target entity and the type of the V2X message, thereby assuring the safety of the driver.

18 Claims, 6 Drawing Sheets

(51) Int. Cl.
  *H04W 4/90* (2018.01)
  *H04W 76/50* (2018.01)
  *H04W 72/10* (2009.01)

(56) References Cited

U.S. PATENT DOCUMENTS

| | | | | |
|---|---|---|---|---|
| 8,499,154 | B2* | 7/2013 | Huntzicker | H04W 12/0609 713/168 |
| 9,117,246 | B2* | 8/2015 | McClellan | G06Q 40/08 |
| 9,705,678 | B1* | 7/2017 | Wang | G06F 21/44 |
| 9,805,601 | B1* | 10/2017 | Fields | G08G 1/096791 |
| 10,096,038 | B2* | 10/2018 | Ramirez | G06Q 30/0224 |
| 10,157,422 | B2* | 12/2018 | Jordan Peters | G06Q 40/08 |
| 2008/0095134 | A1* | 4/2008 | Chen | H04B 7/2606 370/342 |
| 2008/0095163 | A1* | 4/2008 | Chen | H04L 45/16 370/392 |
| 2010/0031042 | A1* | 2/2010 | Di Crescenzo | H04L 63/0876 713/169 |
| 2011/0238987 | A1* | 9/2011 | Kherani | H04W 12/06 713/168 |
| 2013/0278442 | A1* | 10/2013 | Rubin | H04W 74/0816 340/905 |
| 2013/0279491 | A1* | 10/2013 | Rubin | G08G 1/166 370/347 |
| 2015/0163243 | A1* | 6/2015 | Wang | H04L 63/16 726/26 |
| 2015/0326668 | A1* | 11/2015 | Mader | H04W 4/12 455/404.1 |
| 2015/0353008 | A1* | 12/2015 | Kline | B60W 40/04 340/993 |
| 2016/0225897 | A1* | 8/2016 | Sridhar | H01L 29/0653 |
| 2016/0255154 | A1* | 9/2016 | Kim | G09C 1/00 726/25 |
| 2016/0295414 | A1* | 10/2016 | Giraud | H04W 4/44 |
| 2017/0013005 | A1* | 1/2017 | Galula | H04L 63/1425 |
| 2017/0018187 | A1* | 1/2017 | Kim | G08G 1/166 |
| 2017/0032402 | A1* | 2/2017 | Patsiokas | G06Q 30/0207 |
| 2017/0099624 | A1* | 4/2017 | Baghel | H04W 4/70 |
| 2017/0221279 | A1* | 8/2017 | Yu | G07C 5/02 |
| 2017/0245245 | A1* | 8/2017 | Kim | H04W 72/1284 |
| 2017/0270305 | A1* | 9/2017 | Kodama | G06F 21/60 |
| 2017/0287233 | A1* | 10/2017 | Nix | G07C 5/008 |
| 2017/0366358 | A1* | 12/2017 | Lyubashevsky | H04L 9/3255 |
| 2018/0035276 | A1* | 2/2018 | Kang | H04W 76/14 |
| 2018/0053415 | A1* | 2/2018 | Krunic | G08G 1/096775 |
| 2018/0097637 | A1* | 4/2018 | Weinfield | H04W 4/12 |
| 2018/0107532 | A1* | 4/2018 | Park | H04W 4/024 |
| 2018/0124707 | A1* | 5/2018 | Lee | H04W 56/00 |
| 2018/0139593 | A1* | 5/2018 | Chun | H04W 4/12 |
| 2018/0152819 | A1* | 5/2018 | Pinheiro | H04W 4/40 |
| 2018/0159935 | A1* | 6/2018 | Cavalcanti | H04W 4/44 |
| 2018/0176209 | A1* | 6/2018 | Narayanan | H04L 63/0823 |
| 2018/0176742 | A1* | 6/2018 | Narayanan | H04W 4/90 |
| 2018/0184270 | A1* | 6/2018 | Chun | H04W 76/14 |
| 2018/0199194 | A1* | 7/2018 | Xu | H04W 4/046 |
| 2018/0206089 | A1* | 7/2018 | Cavalcanti | H04W 36/0083 |
| 2018/0213365 | A1* | 7/2018 | Yi | H04W 4/06 |
| 2018/0242115 | A1* | 8/2018 | Kim | H04W 4/06 |

\* cited by examiner

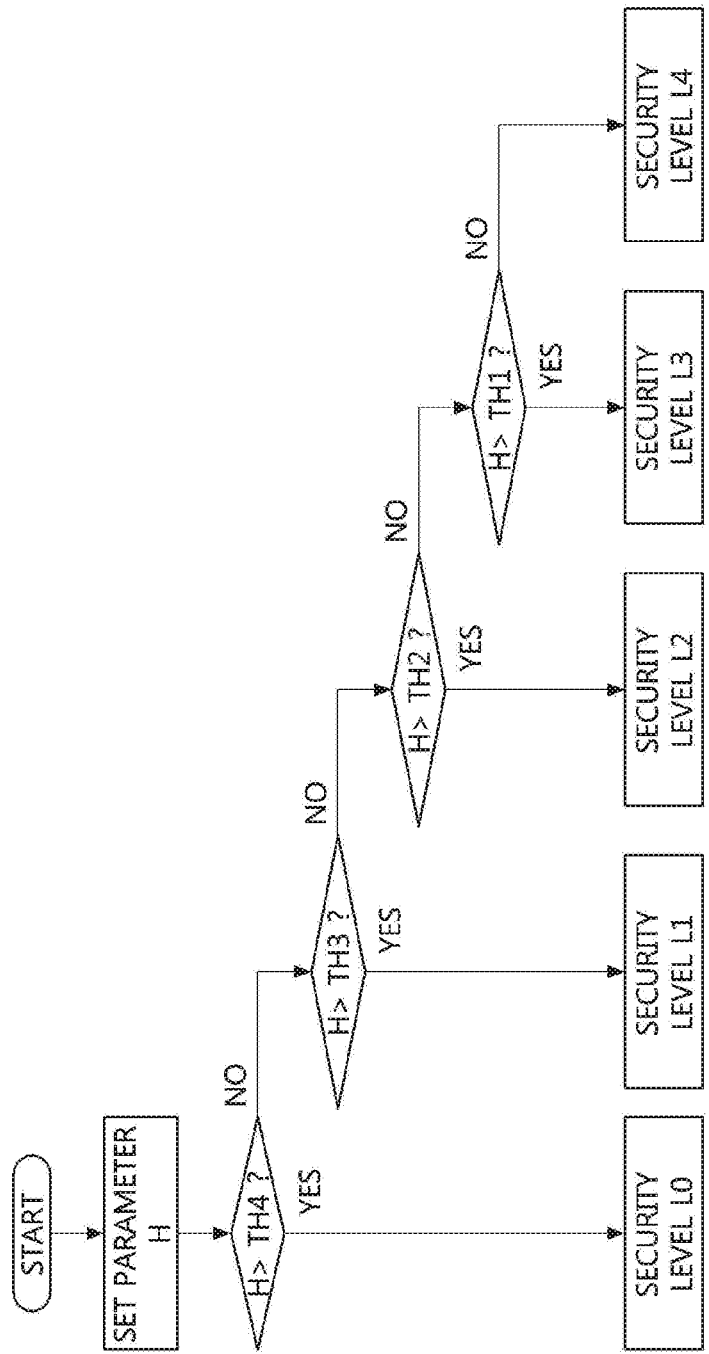

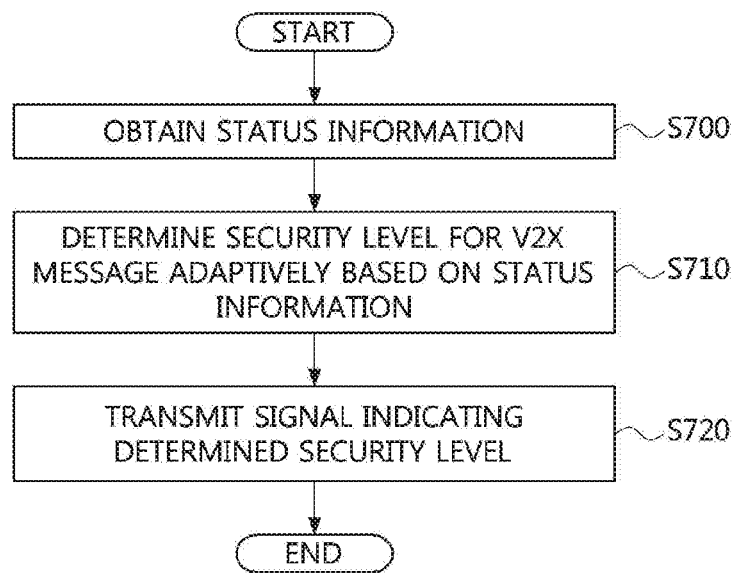
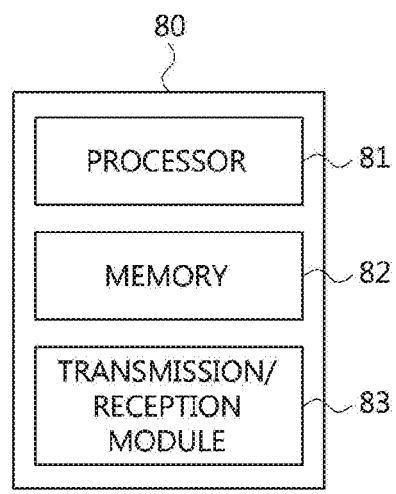

METHOD FOR ADAPTIVELY ADJUSTING SECURITY LEVEL OF V2X COMMUNICATION MESSAGE AND APPARATUS THEREFOR

CROSS-REFERENCE TO RELATED APPLICATIONS

This application is based on and claims the benefit of priority to Korean Patent Application No. 10-2017-0027814 filed on Mar. 3, 2017 in the Korean Intellectual Property Office (KIPO), the entirety of which is incorporated by reference as if fully set forth herein.

TECHNICAL FIELD

The present disclosure relates to a method and an apparatus for adaptively applying a security level to a V2X communication message, and more specifically, to a method and an apparatus for adaptively applying a security level to a V2X communication message in a situation where a safety of a vehicle driver is more important than a security of the V2X communication message.

BACKGROUND

Vehicle communications may be classified into vehicle external communications and vehicle internal communications. Here, the vehicle internal communications which may be referred to as in-vehicle network (IVN) communications are communications between in-vehicle components such as sensors and electronic control units (ECUs).

On the other hand, the vehicle external communications may be communications for transferring information between a vehicle and an object located outside the vehicle, and may be referred to as vehicle-to-everything (V2X) communications. Also, the V2X communications may be classified into a vehicle-to-infrastructure (V2I), a vehicle-to-vehicle (V2V), a vehicle-to-pedestrian (V2P), a vehicle-to-device (V2D), and a vehicle-to-grid (V2G).

Here, for example, the V2X communications may be used to transmit messages such as a forward collision warning message, a lane change warning message, a blind spot warning message, an intersection movement assistance message, an emergency vehicle approaching message, and a platooning message.

In this case, the above-mentioned messages used in the V2X communications or the IVN communications are generally transmitted and received as being satisfying security requirements. Also, the messages satisfying such the security requirements require a heavier computational load than general messages. This heavy computation load may become a threat to the vehicle safety because limited hardware resources of the vehicle can cause the processing of the message to be incomplete within a time to ensure safety.

For example, in a situation where a forward collision warning message is received in a vehicle, the driver of the vehicle may be in great danger unless the message is processed within a reasonable time because the security requirement of the vehicle receiving the message is high. That is, requiring a rigid level of security may be a life-threatening factor for a vehicle driver in such the situation.

Therefore, it is necessary to apply a security level adaptively so that the message for the V2X or IVN communications is processed within a proper time and the safety of the driver in the vehicle is prioritized.

SUMMARY

The present disclosure provides a method of processing a V2X message in an entity transmitting the V2X message.

The present disclosure also provides a method of processing a V2X message in an entity receiving the V2X message.

The present disclosure also provides an apparatus for processing a V2X message.

In accordance with embodiments of the present disclosure, a method of processing a vehicle-to-everything (V2X) message in a V2X message transmitting entity may comprise obtaining status information of a transmission target entity; adaptively determining a security level for a V2X message to be transmitted to the transmission target entity based on the obtained status information; and generating the V2X message according to the determined security level, and transmitting the V2X message to the transmission target entity.

The transmission target entity may be a vehicle, and the status information may include at least one of a speed of the vehicle, a number of vehicles around the vehicle, a number of roadside units (RSUs) around the vehicle, a security level applied in the vehicle, and a message processing resource of the vehicle.

The security level may be determined in consideration of at least one of a type of the V2X message and the transmission target entity.

The security level may be determined based on the status information, according to a number of V2X messages that can be processed by the transmission target entity.

The security level may be determined based on the status information, according to an allowance of a message processing latency.

The security level may be determined according to whether or not a parameter set by combining at least one element included in the status information exceeds predetermined threshold values.

In the generating the V2X message, a scheme for at least one of encryption, authentication, digital signature, and freshness check may be determined according to the determined security level.

The transmitting the V2X message may include transmitting a signal indicating the determined security level. Also, the signal may be included in a header of the V2X message.

Further, in accordance with embodiments of the present disclosure, a method of processing a vehicle-to-everything (V2X) message in a V2X message receiving entity may comprise obtaining status information; adaptively determining a security level of a V2X message to be received based on the obtained status information; and transmitting a signal indicating the determined security level to at least one counterpart entity.

The V2X message receiving entity may be a vehicle, and the status information may include at least one of a speed of the vehicle, a number of vehicles around the vehicle, a number of roadside units (RSUs) around the vehicle, a security level applied in the vehicle, and a message processing resource of the vehicle.

The security level may be determined based on the status information, according to a number of V2X messages that can be processed.

The security level may be determined based on the status information, according to an allowance of a message processing latency.

The security level may be determined according to whether or not a parameter set by combining at least one element included in the status information exceeds predetermined threshold values.

Further, in accordance with embodiments of the present disclosure, a vehicle-to-everything (V2X) message processing apparatus mounted on a V2X message transmitting entity may comprise a processor executing at least one instruction and a memory storing the at least one instruction executed by the processor. Also, the at least one instruction may be configured to obtain status information of a transmission target entity; adaptively determine a security level of a V2X message to be transmitted to the transmission target entity based on the obtained status information; and generate the V2X message according to the determined security level, and transmit the V2X message to the transmission target entity.

The transmission target entity may be a vehicle, and the status information may include at least one of a speed of the vehicle, a number of vehicles around the vehicle, a number of roadside units (RSUs) around the vehicle, a security level applied in the vehicle, and a message processing resource of the vehicle.

The security level may be determined according to whether or not a parameter set by combining at least one element included in the status information exceeds predetermined threshold values.

Further, in accordance with embodiments of the present disclosure, a vehicle-to-everything (V2X) message processing apparatus mounted on a V2X message receiving entity may comprise a processor executing at least one instruction and a memory storing the at least one instruction executed by the processor. Also, the at least one instruction may be configured to obtain status information; adaptively determine a security level of a V2X message to be received based on the obtained status information; and transmit a signal indicating the determined security level to at least one counterpart entity.

The V2X message receiving entity may be a vehicle, and the status information includes at least one of a speed of the vehicle, a number of vehicles around the vehicle, a number of roadside units (RSUs) around the vehicle, a security level applied in the vehicle, and a message processing resource of the vehicle.

The security level may be determined according to whether or not a parameter set by combining at least one element included in the status information exceeds predetermined threshold values.

Using the apparatus or method for processing V2X messages according to the present disclosure as described above, security policies (e.g., security levels) for V2X messages can be determined adaptively. Also, because the security policies (e.g., security levels) of the V2X messages are adaptively determined, the V2X messages can be processed according to a processing capability of a receiving vehicle and the type of the V2X message, thereby assuring the safety of the driver. In particular, efficient message processing can be performed even when a processing resource of a vehicle receiving the V2X messages is limited.

BRIEF DESCRIPTION OF DRAWINGS

Embodiments of the present disclosure will become more apparent by describing in detail forms of the present disclosure with reference to the accompanying drawings, in which:

FIG. 5 is a flowchart for explaining a security level determination by comparing a parameter with threshold values according to an embodiment of the present disclosure;

FIG. 7 is a flowchart for explaining a method of processing a V2X message in a V2X message receiving entity according to an embodiment of the present disclosure; and FIG. 8 is a block diagram illustrating a V2X message processing apparatus according to an embodiment of the present disclosure.

Figure 1:
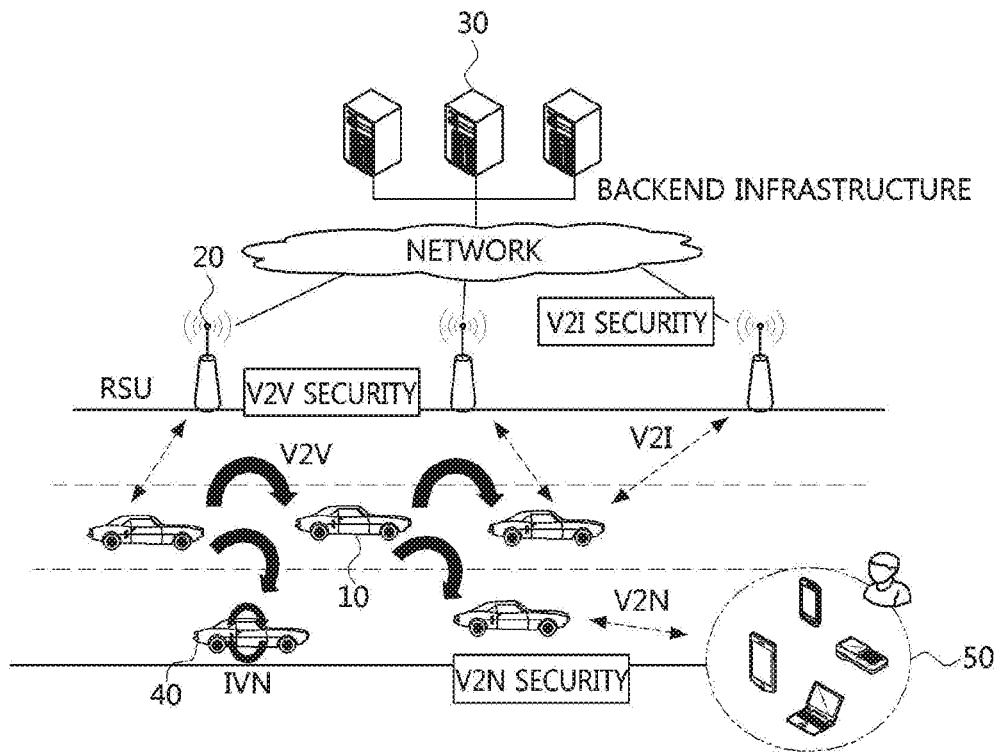
FIG. 1 is a conceptual diagram illustrating an environment in which a V2X message is transmitted and received according to an embodiment of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although forms are described herein as using a plurality of units to perform the exemplary process, it is understood that the exemplary processes may also be performed by one or plurality of modules. Additionally, it is understood that a controller/control unit may perform one or more of the processes described further below, and the term controller/control unit refers to a hardware device that includes a memory and a processor. The memory is configured to store the modules, and the processor is specifically configured to execute said modules to perform one or more processes which are described further below. Moreover, it is understood that the units or modules described herein may embody a controller/control unit for controlling operation of the unit or module.

Furthermore, control logic of the present disclosure may be embodied as non-transitory computer readable media on a computer readable medium containing executable program instructions executed by a processor, controller/control unit or the like. Examples of the computer readable mediums include, but are not limited to, read-only memory (ROM), random access memory (RAM), compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several forms, specific embodiments will be shown in the accompanying drawings and be described in detail in the detailed description. It should be understood, however, that it is not intended to limit the present disclosure to the specific embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a conceptual diagram illustrating an environment in which a V2X message is transmitted and received according to an embodiment of the present disclosure.

Referring to FIG. 1, various V2X communication messages (hereinafter, also simply referred to as 'V2X messages') may be transmitted and received according to counterpart entities.

For example, messages may be transmitted and received between a vehicle 10 and a counterpart vehicle (i.e., V2V), and messages may be transmitted and received between the vehicle 10 and an infrastructure (i.e., V2I). Here, the infrastructure may include a roadside unit (RSU) 20 located around a traveling path of the vehicle 10, or a back-end server or a traffic control system 30 which is connected to the RSU 20 through a network, which collects and distributes information on various disaster or emergency situations.

Also, IVN messages may be transmitted and received between components 40 such as sensors and ECUs in the vehicle, and vehicle-to-network (V2N) messages may be transmitted and received between the vehicle and a network constituted by a mobile terminal 50 carried by a pedestrian.

Here, the messages transmitted and received in the V2V communications may include a speed and a current position of the vehicle, warnings derived from the sensors, and the like. The messages transmitted and received in V2I communications may include warnings of disaster or emergency situations, traffic situations or traffic signal information.

Hereinafter, the communications between the vehicle and other external entities such as V2V communications, V2I communications, and V2N communications may be collectively referred to as V2X communications.

Also, a method and an apparatus proposed in embodiments of the present disclosure may be applied to various communication technologies such as a long-term evolution (LTE), an LTE-advanced (LTE-A), a high speed downlink packet access (HSDPA), a high speed uplink packet access (HSUPA), a high rate packet data (HRPD), a wideband code division multiple access (WCDMA), an institute of electrical and electronics engineers (IEEE) 802.16m, IEEE 802.16e, evolved packet system (EPS), a mobile internet protocol (mobile IP), etc.

Also, a method and an apparatus proposed in embodiments of the present disclosure may be applied to various broadcasting technologies such as a digital multimedia broadcasting (DMB), a digital video broadcasting handheld (DVP-H), an advanced television system committee-mobile/handheld (ATSCH-M/H), an internet protocol television (IPTV), a moving picture experts group media transport (MPEG-MMT), etc.

Meanwhile, the vehicle may be at a risk for malicious manipulation by an attacker, such as stealing or modifying vehicle GPS information, or modifying a physical address of a communication module. Also, an attacker may duplicate and transmit a message of the vehicle to an unjust purpose. Therefore, in the case of V2X communications, it is necessary to maintain security of V2X messages to prevent various attacks, thereby ensuring consistent performance.

For this purpose, it is necessary to adaptively apply a security level by analyzing a current status of the vehicle in real time and analyzing the type of the received message without applying a fixedly-determined security level to the V2X communication according to a predetermined standard.

Accordingly, a method of adaptively applying a security level to a V2X message will be described in order to achieve the above object. In the following description, even though the V2X communication is described as an example, embodiments of the present disclosure are not limited thereto, and the method and apparatus to be described later may also be applied to the communication messages inside the vehicle such as IVN messages.

Figure 2:
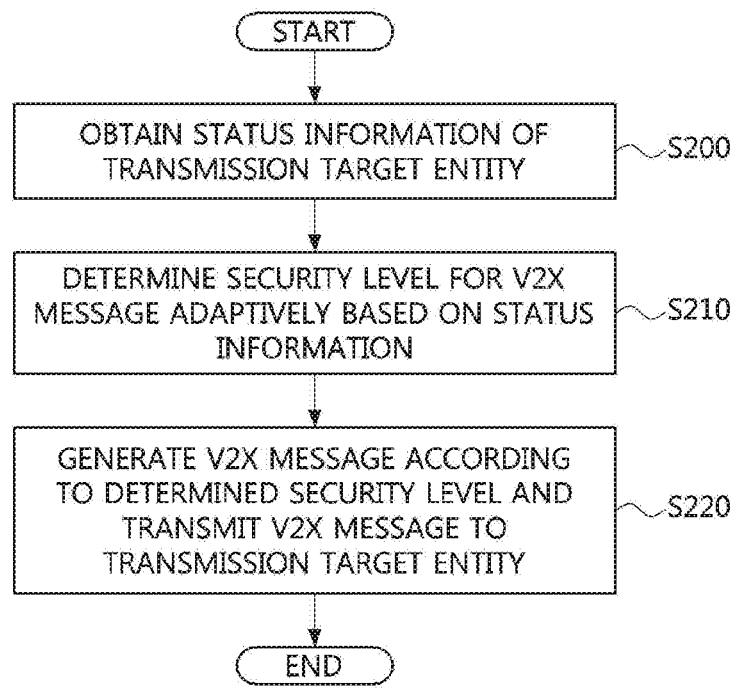
FIG. 2 is a flowchart for explaining a method of processing a V2X message in a V2X message transmitting entity according to an embodiment of the present disclosure.

FIG. 2 is a flowchart for explaining a method of processing a V2X message in a V2X message transmitting entity according to an embodiment of the present disclosure.

Referring to FIG. 2, a method of processing a V2X message in a V2X message transmitting entity may comprise a step S200 of obtaining status information of a transmission target entity (S200), a step S210 of adaptively determining a security level for a V2X message to be transmitted to the transmission target entity based on the obtained status information, and a step S220 of generating the V2X message according to the determined security level and transmitting the generated V2X message to the transmission target entity.

The V2X message transmitting entity or a V2X message receiving entity may include various entities for transmitting and receiving the V2X message, such as an infrastructure, a mobile terminal, and a vehicle, as shown in FIG. 1.

In the step S200, the various entities may periodically transmit their status information, and the V2X message transmitting entity may obtain the status information. Alternatively, the V2X message transmitting entity may transmit a request message requesting status information to the receiving entity, and the receiving entity may transmit its status information to the transmitting entity in response to the request message.

Also, the status information may be information including a current status of the receiving entity itself and an environmental status of the receiving entity, and may be used for determining the security level in the step S210. The detail on the status information will be described with reference to FIG. 3.

Table 1 below summarizes application examples of message security processing according to various security levels.

In Table 1, 'O' may denote that the corresponding processing is applied, and 'X' may denote that the corresponding processing is not applied. That is, according to security levels L0 to L4, security processing for various messages may be differently applied.

For example, if the security level is the lowest level L0, asymmetric encryption may not be applied and only symmetric encryption may be applied. Also, even in the case of the symmetric encryption, different encryption scheme or algorithm may be applied according to the security level. For example, in the case of the lowest security level L0, a relatively simple AES128 algorithm may be applied. In the case of the highest security level L4, an AES512 algorithm, which is complicated and has a high processing load, may be applied.

In addition, depending on the security level, a digital signature scheme (RSA or ECC) and algorithm may be different, and a hash algorithm, which is one of one-way encryption techniques, may be different. Also, a random number generation method, a message freshness verification method, and authentication method may be applied differently.

Accordingly, the step S220 may include a step of determining a detail scheme (e.g., algorithm or processing type) of at least one of encryption, authentication, digital signature, and freshness verification which are to be applied to the V2X message according to the determined security level.

Here, the step S220 may further include a step of transmitting a signal indicating the determined security level. The signal indicating the determined security level may be transmitted as included in the V2X message. For example, the signal indicating the determined security level may be included in a header of the V2X message.

Table 2 below is a table representing a configuration example of the signal indicating the determined security level.

TABLE 2

| Mandatory/Optional | Security level | Binary code |
| --- | --- | --- |
| Mandatory | L4 | 0000 |
| Mandatory | L3 | 0001 |
| Mandatory | L2 | 0010 |
| Mandatory | L1 | 0011 |
| Mandatory | L0 | 0100 |
| Reserved | | 0101 |
| Reserved | | 0110 |
| Reserved | | 0111 |
| Optional | L4 | 1000 |

TABLE 1

| | | L4 (Very high level) | L3 (High level) | L2 (Medium level) | L1 (Low level) | L0 (Very low level) |
| --- | --- | --- | --- | --- | --- | --- |
| Asymmetric encryption | RSA | O RSA2048 | O RSA2048 | O RSA1024 | O RSA1024 | X |
| | ECC | O ECC224 | O ECC224 | O ECC160 | O ECC160 | X |
| Symmetric encryption | | O AES512 | O AES256 | O AES256 | O AES256 | O AES128 |
| Digital signature | RSA | O RSA2048 | O RSA2048 | O RSA1024 | O RSA1024 | X |
| | ECC | O ECDSA224 | O ECDSA224 | O ECDSA160 | O ECDSA160 | X |
| Hash | | O SHA512 | O SHA256 | O SHA256 | O SHA256 | O SHA160 |
| Random generation | | O TRNG (H/W based) | O TRNG (S/W based) | O PRNG | O PRNG | O PRNG |
| Freshness | | O | O | O | O | X |
| Authentication | | Mutual authentication | Mutual authentication | One-way authentication | One-way authentication | X |

TABLE 2-continued

| Mandatory/Optional | Security level | Binary code |
|---|---|---|
| Optional | L3 | 1001 |
| Optional | L2 | 1010 |
| Optional | L1 | 1011 |
| Optional | L0 | 1100 |
| Reserved |  | 1101 |
| Reserved |  | 1110 |
| Reserved |  | 1111 |

Referring to Table 2, assuming that the security levels are defined as 5 levels (i.e., L0 to L4), the signal indicating the determined security level may be transmitted as a binary code. In this case, when the signal is transmitted as included in the V2X message, the binary code may be defined to include whether the V2X message is mandatory or optional.

For example, in case that the V2X message is mandatory, if the adaptively determined security level is lower than the security requirement of the V2X message transmitting entity, a message informing a security failure may be transmitted to the receiving entity (e.g., a vehicle).

Also, in case that the V2X message is optional, if the adaptively determined security level is lower than the security requirement of the V2X message transmitting entity, the V2X message may be ignored and not transmitted.

Figure 3:
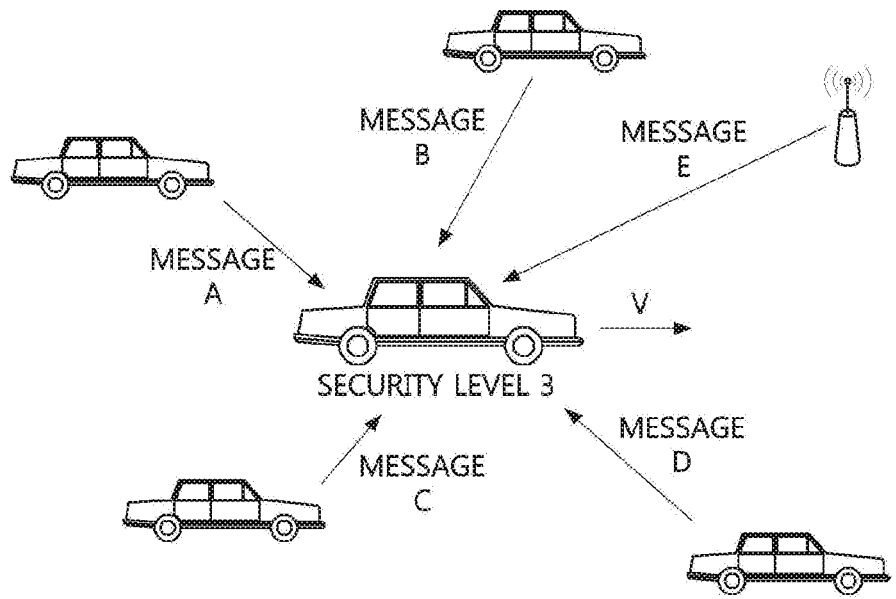
FIG. 3 is a conceptual diagram for explaining status information according to an embodiment of the present disclosure.

FIG. 3 is a conceptual diagram for explaining status information according to an embodiment of the present disclosure.

Referring to FIG. 3, in case that a V2X message receiving entity (i.e., transmission target entity) is a vehicle, it may be explained that the security level is differently applied according to the status information of the vehicle.

For example, when the transmission target entity is a vehicle, the status information may include at least one of a speed V of the vehicle, a number of vehicles around the vehicle, a number of RSUs around the vehicle, a security level applied in the vehicle, and a message processing resource of the vehicle.

Specifically, the faster the speed V of the vehicle, the quicker it is to cope with the external situation so that the risk of the vehicle can be prevented. Therefore, the speed V of the vehicle may be considered to determine the security level so that the V2X message can be urgently processed.

Also, since there are more messages that need to be processed as more entities, such as vehicles or RSUs around the vehicle, are likely to transmit V2X messages (e.g. messages A to E) to the vehicle, or more entities actually transmit V2X messages, these factors (i.e., the number of nearby vehicles and nearby RSUs) may also be considered in determining the security level.

Also, since a security processing load on the received V2X message may increase when the security level of the vehicle receiving the V2X message (e.g., security level 3) is high, the security level of the receiving vehicle may also be considered in determining the security level of the V2X message to be transmitted.

The message processing resource of the vehicle may also be considered in determining the security level. The message processing resource of the vehicle may mean an ECU performance or a memory required to process V2X messages, and may vary depending on the type or options of vehicle. Therefore, the security level may be determined by considering the type or options of vehicle together.

Figure 4:
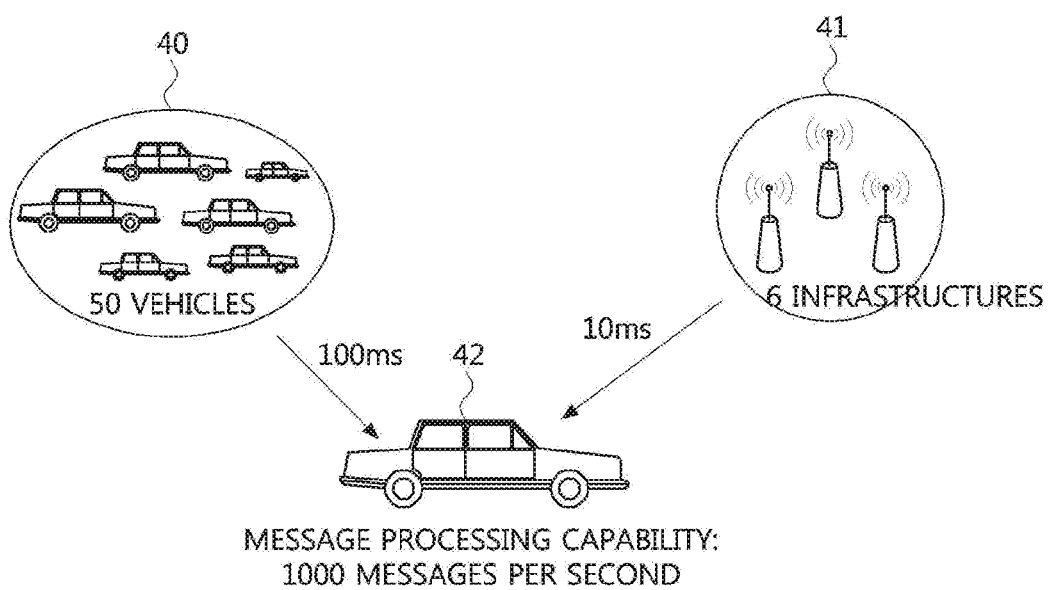
FIG. 4 is a conceptual diagram for explaining a security level determination according to an embodiment of the present disclosure.

FIG. 4 is a conceptual diagram for explaining a security level determination according to an embodiment of the present disclosure.

Referring to FIG. 4, a process of determining the security level based on the number of V2X messages that can be processed by the transmission target entity may be exemplified.

First, it may be assumed that there are 50 vehicles for transmitting V2X messages of security level 3 to a transmission target vehicle 42 with a periodicity of 100 ms, and there are 6 infrastructures for transmitting V2X messages of security level 3 with a periodicity of 10 ms.

The message processing capability of the transmission target vehicle 42 may be determined based on the message processing resource of the vehicle, for example, 1000 messages per second. The transmission target vehicle 42 may receive 500 messages per second from the vehicles 40, and receive 600 messages per second from the infrastructures 41 so that the transmission target vehicle 42 should process 1100 message per second. Accordingly, since the number of received messages per second exceeds the message processing capability of the transmission target vehicle 42 (i.e., 1000 messages per second), the messages may not be processed without delay.

In this case, the transmission target vehicle 42 may lower a permissible message security level to security level 2 and transmit a signal indicating the security level 2 to the nearby entities.

Here, in addition to the status information, the entity transmitting the V2X message may also be considered in determining the security level.

For example, in FIG. 4, the transmission target vehicle 42 may lower the security level for the V2V messages to be transmitted from the vehicles 40 to the security level 2, and maintain the security level for the V2I messages to be transmitted from the infrastructures 41 as the security level 3.

That is, in the step S210 of adaptively determining the security level, the security level may be determined according to the number of messages that can be processed by the transmitting entity based on the status information.

Also, the security level may be determined based on a message processing latency as well as the number of messages.

Referring again to FIG. 4, considering the message processing capability (i.e., 1000 messages/second) of the transmission target vehicle 42, a processing latency of 100 ms may occur for 100 messages except 1000 messages that can be processed out of 1100 messages received in one second.

In this case, it is possible to determine the security level by considering whether the latency is allowed based on the status information of the transmission target vehicle 42. For example, it is possible to determine allowance of the latency and to determine the security level by considering the speed of the target entity vehicle and a time required to respond to a risk of collision.

Accordingly, in the step S210 of adaptively determining the security level, the security level may be determined according to the determined allowance of the latency based on the status information.

FIG. 5 is a flowchart for explaining a security level determination by comparing a parameter with threshold values according to an embodiment of the present disclosure.

Referring to FIG. 5, a process of determining a security level based on a parameter set in consideration of the status information, the type of the message, and the V2X message transmitting entity may be described.

As described above, only a single factor (such as the speed of the vehicle) may not affect the security level, and several factors may affect the security level in a composite manner. Therefore, there may be a need to combine several factors to determine the security level.

For example, a parameter h may be set using at least one element included in the status information as factors. An equation for the parameter h may be, for example, as follows.

$$h = \alpha \times (\text{speed of vehicle}) + \beta \times (\text{number of vehicles around target vehicle}) + \gamma \times (\text{message processing resource}) + \delta \times (\text{security level of target vehicle}) \quad \text{[Equation 1]}$$

Referring to Equation 1, the parameter h may be defined on the basis of the speed of the vehicle speed, the number of surrounding vehicles around the transmission target vehicle, and the like, which constitute the status information described above.

However, Equation 1 is an example, and any element may be determined to have an inverse relationship or an exponential relationship with the security level. Also, an equation for the parameter may be written in a differential equation form.

Here, if the parameter h is not described as a linear relation, the parameter h may be redefined through a linearization process so as to be derived in a linear form. Also, the specific parameter h may be determined experimentally, for example, using linear regression analysis.

Meanwhile, the security level of the message may be determined by comparing the parameter h with predetermined threshold values.

Referring again to FIG. 5, in case that the parameter h is greater than a predetermined fourth threshold value th4, the security level may be determined to be the security level 0 (L0), and in case that the parameter h is between a predetermined third threshold value th3 and the fourth threshold value th4, the security level may be determined to be the security level 1 (L1). Here, the predetermined threshold values (e.g., th1 to th4) may be at least one or more.

In summary, in the step S210 of adaptively determining the security level, a parameter set by combining at least one element included in the status information is compared with one or more predetermined threshold values so as to determine a security level of a V2X message.

Although it has been described that at least one element of the status information is used to set the parameter, not only the status information but also the type of the message or the transmission target vehicle, which may affect the security level as described above, may be used to set the parameter.

FIGS. 6A to 6E are conceptual diagrams for explaining types of V2X messages according to an embodiment of the present disclosure.

Referring to FIGS. 6A to 6E, a concept of setting the security level differently based on the type of the V2X message may be described.

The type of message may be classified according to a classification method, and classified according to the security level previously applied to the message. Also, the type of message may be classified according to the content and importance of the message. Here, if the security level or importance applied to the message is set, the message may include an identification symbol indicating the security level or importance.

Here, depending on the type of the message, there may occur a case where rapid processing is required without delaying the message processing. Such a case may be utilized to affect the security level to be determined adaptively.

For example, in case of a message that informs a driver of a vehicle of an accident occurred very close to the vehicle running at a very high speed, since a risk may be caused to the driver by the processing delay of the message, the type of the message may be utilized to determine the security level together with the status information.

Figure 6A:
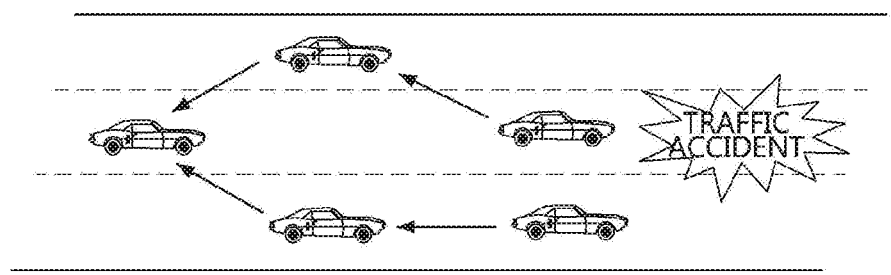
FIGS. 6A to 6E are conceptual diagrams for explaining types of V2X messages according to an embodiment of the present disclosure.

Referring to FIG. 6A, when a traffic accident occurs in the front, a vehicle receiving a traffic accident detection or warning message may sequentially transmit a warning message to vehicles arriving behind the vehicle through the V2V communication (i.e., V2V forward warning propagation).

Figure 6B:
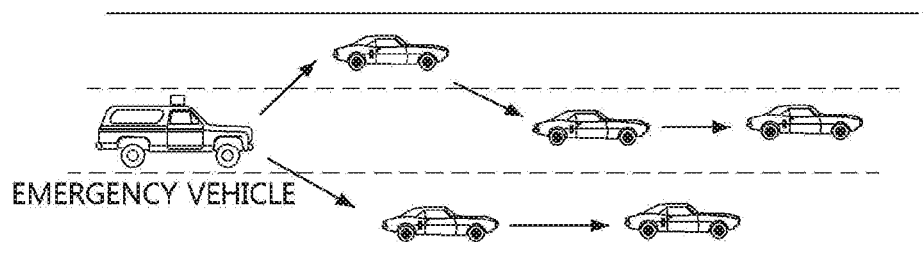

Referring to FIG. 6B, when an emergency vehicle is approaching from the rear, an approach message or a warning message may be transmitted to vehicles in front of the emergency vehicle so that the emergency vehicle can move quickly (i.e., V2V backward warning propagation).

Figure 6C:
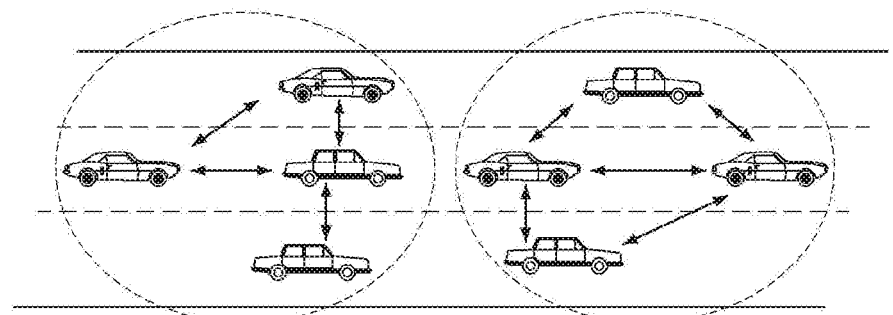

Referring to FIG. 6C, some vehicles may communicate within a group by grouping. For example, vehicles with a route to the same destination may have the same group, and exchange vehicle status information messages (i.e., V2V platooning messages) until they arrive safely at their destination.

Figure 6D:
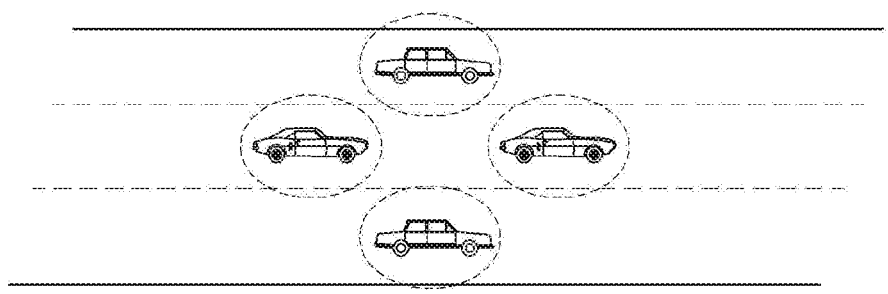

Referring to FIG. 6D, each vehicle may periodically transmit vehicle status information messages (i.e., V2V beaconing messages) including current speed, location, direction, etc. of each vehicle to nearby vehicles.

Figure 6E:
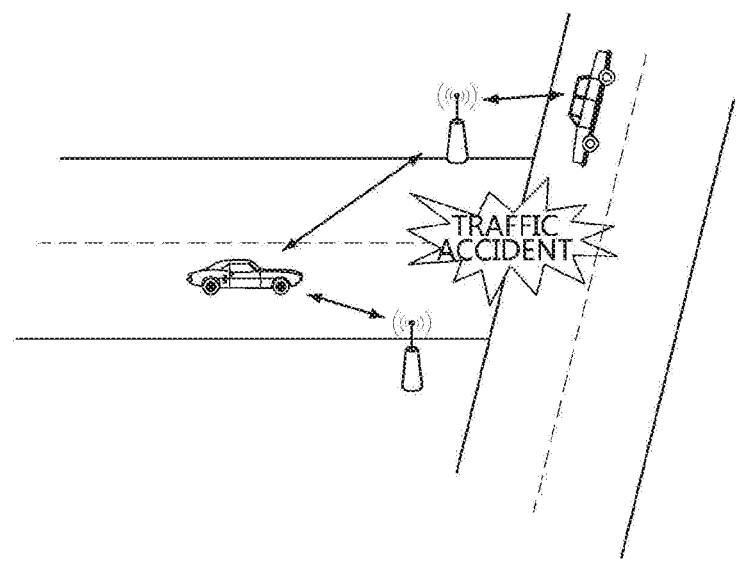

Referring to FIG. 6E, when a traffic accident occurs, an RSU may detect the traffic accident and transmit a warning message (i.e., V2I warning message) to nearby vehicles.

Also, useful information may be exchanged between the vehicles or between the vehicle and the RSU. For example, a message (i.e., V2V/V2I information exchange) including the useful information (e.g., traffic signal information, vehicle status information, road surface condition, toll information, etc.) may be exchanged.

That is, as shown in FIGS. 6A to 6D, messages according to various situations may be transmitted and received. The security level of the specific type of message may be adaptively determined so that the specific type of message can be processed quickly by considering the status information and the type of the message in the composite manner.

Table 3 is an example of defining different security requirements at a specific security level determined adaptively considering the type of message.

TABLE 3

|  | V2V warning propagation | V2V platooning communication | V2V beaconing | V2I warning | V2V/V2I information exchange |
|---|---|---|---|---|---|
| Authentication of vehicle and RSU | ○ | ▲ | ○ | ○ | ○ |
| Message integrity | ○ | ○ | ○ | ○ | ○ |
| Confidentiality | — | ○ | — | — | ○ |
| Privacy protection | ○ | ○ | ○ | ▲ | ○ |
| Non-repudiation | ○ | — | ○ | ○ | ○ |
| Availability | ○ | ○ | ○ | ○ | ○ |
| Freshness | ○ | ○ | ○ | ○ | ○ |
| Misbehavior check | ○ | ○ | ○ | ○ | ○ |

Referring to Table 3, at a certain security level determined adaptively, different security requirements may be defined according to the types of messages.

In particular, authentication of vehicle and RSU, verification of message integrity, assurance of confidentiality, privacy protection measures, non-repudiation measures, availability configuration, freshness verification, misbehavior check, and the like may be fully-applied (as denoted by 'O'), partially applied (as denoted by '▲'), or not applied (as denoted by '-').

Accordingly, different security levels may be adaptively determined according to the types of messages, and the specific security level determined adaptively may require different security measures according to the types of messages.

FIG. 7 is a flowchart for explaining a method of processing a V2X message in a V2X message receiving entity according to an embodiment of the present disclosure.

Referring to FIG. 7, a V2X message processing method of a V2X message receiving entity may comprise a step S700 of obtaining status information, a step S710 of adaptively determining a security level for a V2X message to be received based on the obtained status information, and a step S720 of transmitting a signal indicating the determined security level to at least one counterpart entity (or, at least one nearby entity).

Here, the V2X message receiving entity may be a vehicle. Also, the status information may include at least one of a speed of the vehicle, the number of vehicles around the vehicle, a security level applied in the vehicle, and a message processing resource of the vehicle.

In the step S710 of adaptively determining the security level, the security level may be determined according to the number of messages that can be processed based on the status information.

Also, in the step of determining the security level adaptively (S710), the security level may be determined according to the allowance of the message processing latency based on the status information.

Also, in the step S710 of determining the security level adaptively (S710), the security level may be determined according to whether or not a parameter set by combining at least one element included in the status information exceeds predetermined threshold values.

In addition, the same or corresponding V2X message processing as in FIG. 2 may be performed. However, unlike the case of FIG. 2, since the V2X message receiving entity adaptively determines the security level, the signal indicating the determined security level may be transmitted to at least one counterpart entity (or, at least one nearby entity), and the at least one entity (e.g., nearby vehicles) receiving the message may transmit their messages with reference to the received security level.

FIG. 8 is a block diagram illustrating a V2X message processing apparatus according to an embodiment of the present disclosure.

Referring to FIG. 8, a V2X message processing apparatus 80 may comprise a processor 81 executing at least one instruction, and a memory 82 storing the at least one instruction. The V2X message processing apparatus 80 may be mounted on a V2X message transmitting entity.

The processor 81 may obtain status information of a transmission target entity, adaptively determine a security level of a V2X message to be transmitted to the transmission target entity according to the obtained status information, generate the V2X message according to the determined security level, and transmit the generated V2X message to the transmission target entity.

The V2X message processing apparatus 80 may further include a transmission/reception module 83 for transmitting/receiving V2X messages, and the processor may transmit or receive the V2X messages through the transmission/reception module 83 by controlling the transmission/reception module 83 to transmit or receive the V2X messages.

The transmission target entity may be a vehicle. Also, the status information may include at least one of a speed of the vehicle, the number of vehicles around the vehicle, the number of RSUs around the vehicle, a security level applied in the vehicle, and a message processing resource of the vehicle.

The processor 81 may determine the security level of the V2X message according to whether or not a parameter set by combining at least one element included in the status information exceeds predetermined threshold values.

Meanwhile, a V2X message processing apparatus according to another embodiment of the present disclosure may comprise a processor executing at least one instruction, and a memory storing the at least one instruction. The V2X message processing apparatus may be mounted on a V2X message receiving entity.

The processor may obtain status information of the V2X message receiving entity, adaptively determine a security level of a V2X message to be received based on the obtained status information, and transmit a signal indicating the determined security level to at least one nearby entities.

The V2X message processing apparatus according to another embodiment of the present disclosure may further include a transmission/reception module for transmitting/receiving V2X messages, and the processor may transmit or receive the V2X messages through the transmission/reception module by controlling the transmission/reception module to transmit or receive the V2X messages.

The V2X message receiving entity may be a vehicle. Also, the status information may include at least one of a speed of the vehicle, the number of vehicles around the vehicle, the number of RSUs around the vehicle, a security level applied to the vehicle, and a message processing resource of the vehicle.

The processor may determine the security level of the V2X message according to whether or not a parameter set by combining at least one element included in the status information exceeds predetermined threshold values.

Examples of the V2X message processing apparatus according to the embodiments of the present disclosure may include any kind of devices having communication capability, such as a telematics system, a desktop computer, a laptop computer, a notebook, a smart phone, a tablet PC, a mobile phone, a smart watch, smart glasses, an e-book reader, a portable multimedia player (PMP), a portable gaming device, a navigation device, a digital camera, a digital audio player, a digital video recorder, a digital video player, and a personal digital assistant (PDA).

Also, the V2X message processing apparatus according to an embodiment of the present disclosure may operate in conjunction with a driver assistance system, which may provide the driver with a visual, tactile, or audible warning, or control a steering wheel by assisting the driver. Thus, a message received or processed by the V2X message processing apparatus may be forwarded to the driver assistance system.

The methods according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software. Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the embodiments of the present disclosure and their advantages have been described in detail above, it should be understood that various changes, substitutions and alterations may be made herein without departing from the scope of the disclosure.

What is claimed is:

1. A method of processing a vehicle-to-everything (V2X) message in a V2X message transmitting entity, the method comprising:
   obtaining, at the V2X message transmitting entity, status information of a transmission target entity;
   determining a type of a V2X message to be transmitted to the transmission target entity;
   adaptively determining a security level for the V2X message based on the type of the V2X message and a number of V2X messages that can be processed by the transmission target entity in a predetermined time duration;
   generating the V2X message by applying a scheme for at least one of encryption, authentication, digital signature, or freshness check, the scheme being determined according to the determined security level; and
   transmitting the V2X message to the transmission target entity,
   wherein the type of the V2X message includes at least one of a vehicle-to-vehicle (V2V) warning propagation, a V2V platooning, a V2V beaconing, or a vehicle-to-infrastructure (V2I) warning.

2. The method of processing a V2X message in a V2X message transmitting entity according to claim 1,
   wherein the transmission target entity is a vehicle, and the status information includes at least one of a speed of the vehicle, a number of vehicles around the vehicle, a number of roadside units (RSUs) around the vehicle, a security level applied in the vehicle, or a message processing resource of the vehicle.

3. The method of processing a V2X message in a V2X message transmitting entity according to claim 2, wherein said number of V2X messages is determined based on the status information of the transmission target entity.

4. The method of processing a V2X message in a V2X message transmitting entity according to claim 2, wherein the security level is further determined according to whether a message processing latency is allowed by the transmission target entity based on the status information.

5. The method of processing a V2X message in a V2X message transmitting entity according to claim 2, wherein the security level is further determined according to whether or not a parameter set by combining at least one element included in the status information exceeds predetermined threshold values.

6. The method of processing a V2X message in a V2X message transmitting entity according to claim 1, wherein the transmitting the V2X message includes transmitting a signal indicating the determined security level.

7. The method of processing a V2X message in a V2X message transmitting entity according to claim 6, wherein the signal is included in a header of the V2X message.

8. A method of processing a vehicle-to-everything (V2X) message in a V2X message receiving entity, the method comprising:
   obtaining, at the V2X message receiving entity, status information of the V2X message receiving entity,
   determining a type of a V2X message to be transmitted to the V2X message receiving entity;
   adaptively determining a security level of the V2X message based on the type of the V2X message and a number of V2X messages that can be processed by the V2X message receiving entity in a predetermined time duration, the security level determining a scheme for at least one of encryption, authentication, digital signature, or freshness check, the scheme being applied to generation of the V2V message for at least one counterpart entity; and
   transmitting a signal indicating the determined security level to the at least one counterpart entity,
   wherein the type of the V2X message includes at least one of a vehicle-to-vehicle (V2V) warning propagation, a V2V platooning, a V2V beaconing, or a vehicle-to-infrastructure (V2I) warning.

9. The method of processing a V2X message in a V2X message receiving entity according to claim 8,
   wherein the V2X message receiving entity is a vehicle, and the status information includes at least one of a speed of the vehicle, a number of vehicles around the vehicle, a number of roadside units (RSUs) around the vehicle, a security level applied in the vehicle, or a message processing resource of the vehicle.

10. The method of processing a V2X message in a V2X message receiving entity according to claim 9, wherein the said number of V2X messages is determined based on the status information of the V2X message receiving entity.

11. The method of processing a V2X message in a V2X message receiving entity according to claim 9, wherein the security level is further determined according to whether a message processing latency is allowed by the V2X message receiving entity based on the status information.

12. The method of processing a V2X message in a V2X message receiving entity according to claim 9, wherein the security level is further determined according to whether or not a parameter set by combining at least one element included in the status information exceeds predetermined threshold values.

13. A vehicle-to-everything (V2X) message processing apparatus mounted on a V2X message transmitting entity, comprising:
   a processor executing at least one instruction; and
   a memory storing the at least one instruction executed by the processor, wherein the at least one instruction causes the processor to:
      obtain status information of a transmission target entity,
      determine a type of a V2X message to be transmitted to the transmission target entity,
      adaptively determine a security level of the V2X message to be transmitted to the transmission target entity based on the type of the V2X message and a number of V2X messages that can be processed by the transmission target entity in a predetermined time duration,
      generate the V2X message by applying a scheme for at least one of encryption, authentication, digital signature, or freshness check, the scheme being determined according to the determined security level, and transmit the V2X message to the transmission target entity, wherein the type of the V2X message includes at least one of a vehicle-to-vehicle (V2V) warning propagation, a V2V platooning, a V2V beaconing, or a vehicle-to-infrastructure (V2I) warning.

14. The V2X message processing apparatus according to claim 13, wherein the transmission target entity is a vehicle, and the status information includes at least one of a speed of the vehicle, a number of vehicles around the vehicle, a number of roadside units (RSUs) around the vehicle, a security level applied in the vehicle, and or a message processing resource of the vehicle.

15. The V2X message processing apparatus according to claim 14, wherein the security level is further determined according to whether or not a parameter set by combining at least one element included in the status information exceeds predetermined threshold values.

16. A vehicle-to-everything (V2X) message processing apparatus mounted on a V2X message receiving entity, comprising:

a processor executing at least one instruction; and a memory storing the at least one instruction executed by the processor, wherein the at least one instruction causes the processor to:

obtain status information of the V2X message receiving entity, determine a type of a V2X message to be transmitted to the V2X message receiving entity, determine adaptively a security level of the V2X message based on the type of the V2X message and a number of V2X messages that can be processed by the V2X message receiving entity in a predetermined time duration, the security level determining a scheme for at least one of encryption, authentication, digital signature, or freshness check, the scheme being applied to generation of the V2V message for at least one counterpart entity, and transmit a signal indicating the determined security level to the at least one counterpart entity, wherein the type of the V2X message includes at least one of a vehicle-to-vehicle (V2V) warning propagation, a V2V platooning, a V2V beaconing, or a vehicle-to-infrastructure (V2I) warning.

17. The V2X message processing apparatus according to claim 16, wherein the V2X message receiving entity is a vehicle, and the status information includes at least one of a speed of the vehicle, a number of vehicles around the vehicle, a number of roadside units (RSUs) around the vehicle, a security level applied in the vehicle, or a message processing resource of the vehicle.

18. The V2X message processing apparatus according to claim 17, wherein the security level is further determined according to whether or not a parameter set by combining at least one element included in the status information exceeds predetermined threshold values.

* * * * *